United States Patent
Laureanno

Patent Number: 5,812,758
Date of Patent: Sep. 22, 1998

[54] SYSTEM LEVEL AID FOR TROUBLESHOOTING (SLAT)

[75] Inventor: Thomas Laureanno, Tiverton, R.I.

[73] Assignee: The United States of America as represented by the Secretary of the Navy, Washington, D.C.

[21] Appl. No.: 570,466

[22] Filed: Nov. 9, 1995

[51] Int. Cl.⁶ .................................................. G06F 11/00
[52] U.S. Cl. ................................ 395/183.22; 395/185.1; 395/183.01; 364/DIG. 1
[58] Field of Search ........................ 395/183.22, 183.02, 395/182.08, 183.01, 185.1, 916, 182.13, 326, 352; 364/DIG. 1, DIG. 2

[56] References Cited

U.S. PATENT DOCUMENTS

| | | | |
|---|---|---|---|
| 5,127,006 | 6/1992 | Subramanian et al. | 395/183.11 |
| 5,237,677 | 8/1993 | Hirosawa et al. | 395/575 |
| 5,309,448 | 5/1994 | Bouloutas et al. | 371/29.1 |
| 5,363,366 | 11/1994 | Wisdom, Jr. et al. | 370/13 |
| 5,528,748 | 6/1996 | Wallace | 395/183.01 |

*Primary Examiner*—Robert W. Beausoliel, Jr.
*Assistant Examiner*—Dieu-Minh Le
*Attorney, Agent, or Firm*—Michael J. McGowan; Prithvi C. Lall; Michael F. Oglo

[57] ABSTRACT

This invention relates generally to a method and apparatus for isolating and analyzing faults in a complex system which is represented by a network comprising a plurality of nodes interconnected by links defining the flow among nodes corresponding to flows in the complex system. The complex system is stored as a database internal to the apparatus and represents a physical system under test. The apparatus localizes faults in the system by utilizing data structure search methods invoked by the operator successively passing and/or failing system nodes based on observed system status and technical information provided by the apparatus.

19 Claims, 4 Drawing Sheets ically, it is an object of the present invention to provide a portable computer based fault localization tool which operates on user defined nodal networks which can be representative of actual physical systems.
SYSTEM LEVEL AID FOR TROUBLESHOOTING (SLAT)

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

(1) Field of the Invention

This invention relates generally to a method and apparatus for isolating and analyzing faults in a system that can be represented by a nodal network. More particularly, the invention relates to a method and apparatus for isolating defective hardware/software which causes faults in such a system, utilizing operator input representing faults generated internal to the system under test and operator input representing probable fault locations determined by the operator. A preferred embodiment of the invention is a computer based system that is both easily transportable and not solely dependant on the internal fault generation capability of the system under test.

(2) Description of the Prior Art

Various techniques are known for isolating faults in systems represented by nodal networks, such as data processing systems, where the components of the system are coupled by a plurality of communication links. For example, data processing systems may employ internal checkpoints which generate an error if the flow received is not correct. Such systems typically operate with no operator intervention. The software within such a system will utilize this internal checkpoint node as a starting point for the fault localization process. A predefined nodal network representation will then be traversed during the Fault Localization Process (FLP) at a point beginning with this checkpoint node. This process is totally dependent upon the checkpoint reporting errors. If any of these errors became lost or are misinterpreted in any way during the localization process, the result would be useless to the troubleshooter. The dependency of the fault localization process on these internal checkpoints is time consuming and in some cases, impractical. Without any human intervention during the fault localization process, the software is allowed to run on its own, and high confidence and assurance must be given to the internal checkpoints.

Other approaches to troubleshooting have drawbacks that render them ineffective as systems become more complex. Given a failure, these approaches enable a set of input values to be determined for which the output of the failed component differs from the expected output with a good component. This approach relies on the theory of "test generation", rather than actually diagnosing failed components. It provides little assistance in identifying what failure to consider or, more importantly, what component to suspect which could have failed. Another drawback to current methods of troubleshooting is that they are generally "ad hoc" to a single circuit or system, and it is difficult to modify or adapt them to handle evolving or changing configurations, which is typical of digital data processing systems. This is particularly true of various expert systems employing rules, which are usually limited to specific configurations. Typically, the rules result from extensive and time-consuming discussions with experts. When the configuration changes, new rules have to be provided, often requiring repeating the discussions. Furthermore, if the expert system does not have a rule for a particular circumstance, it is unable to provide assistance, and, when that occurs, service personnel must often interact with the design engineers to locate the failed component. There is thus a need for a fault localization system which is free of the foregoing problems.

SUMMARY OF THE INVENTION

Accordingly, it is an object of the present invention to provide a portable computer based fault localization tool which operates on user defined nodal networks which can be representative of actual physical systems.

Another object of the invention is to localize faults in a system by the operator passing and failing nodes in the nodal network based on component failure of the physical system under test, an operator's personal knowledge of the system, and/or information derived from the on-line technical documentation.

Another object of the invention is to enable an operator to troubleshoot a system without physical connection thereto.

Another object of the invention is to utilize programmed fault localization methods which expedite the fault localization process.

In brief summary, System Level Aid for Troubleshooting (SLAT), is an autonomous, self-contained, fault localization tool which is designed for ease of portability to run on a laptop computer. After loading a database containing a user defined system network, connectivity (signal flows) of the system is graphically displayed to aid the operator in each step of the Fault Localization Process. SLAT accepts passed or failed nodes introduced by the operator. The operator determines a node to be passed or failed based on internally generated system status of the actual system under test, experience in working with a particular system, and review of SLAT generated technical documentation. SLAT operates to isolate the source of faults down to a particular piece of equipment or "unit", hereinafter called equipment. The piece of equipment is represented by a node in a SLAT database containing the user defined system network. Technical documentation pertaining to each node is also contained in a SLAT database and access to this technical documentation will aid the operator to repair and troubleshoot a piece of equipment, if required. SLAT records which test points the operator analyzes and does the required "bookkeeping" to graphically depict the progress of fault localization. SLAT has no physical connections to the system under test and requires operator intervention during the fault localization process. Reliance on the internal fault generation of the system under test is at the discretion of the operator. If it is determined that the internal fault generation of the system under test is erroneous the operator can restrict input of these failures. SLAT provides recommendations to the operator as to where to troubleshoot a system during fault localization based on programmed fault localization methods to be described hereinafter. The SLAT software environment has user assistance routines, a help screen, and an interactive tutorial which the user can invoke. SLAT can also perform fault isolation in systems containing feedback loops. A feedback loop is defined as a sequence of successive nodes linked together to form a cycle. The cyclic property causes special conventions and methods of fault localization to be invoked by SLAT and will be discussed in further detail hereinafter.

BRIEF DESCRIPTION OF THE DRAWING(s)

DESCRIPTION OF THE PREFERRED EMBODIMENT

Figure 1:
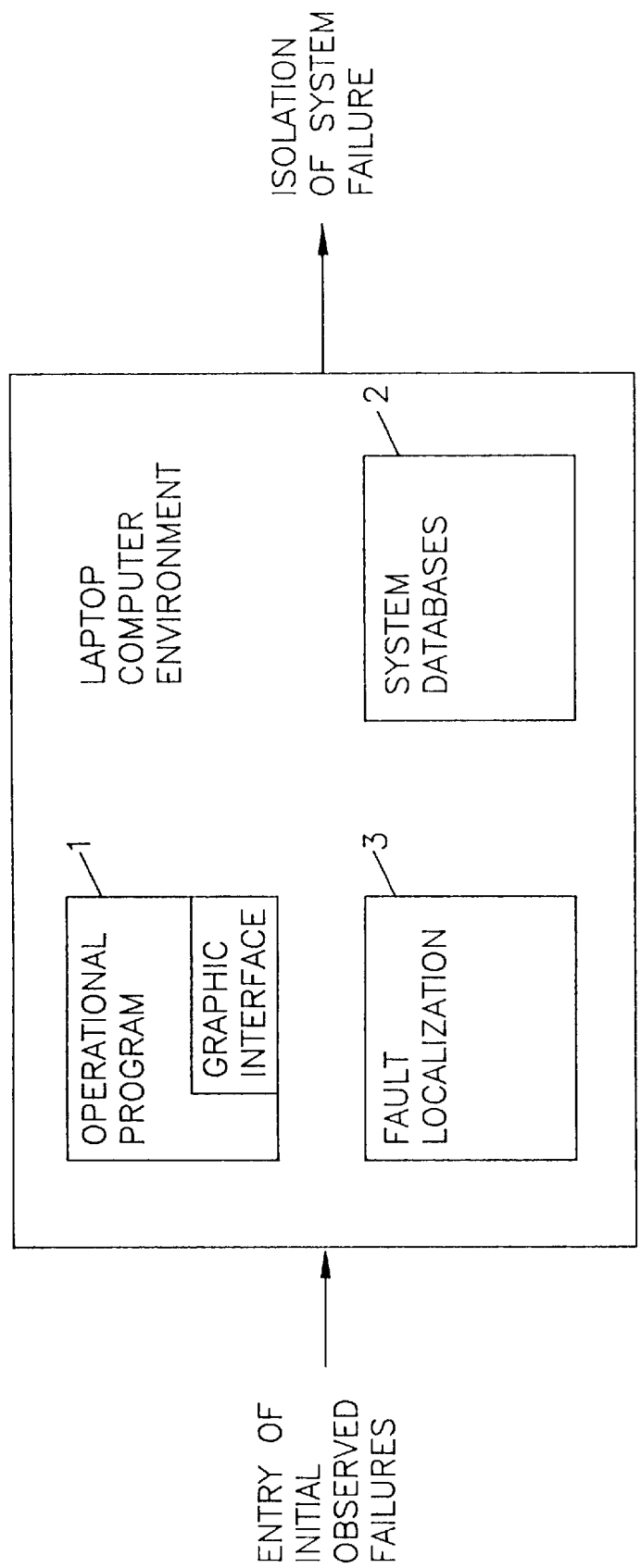
FIG. 1 is a high level block diagram of SLAT program interfaces.

The computer system necessary to implement SLAT, in its preferred embodiment, is a computer that is easily transportable, and is preferably IBM compatible. A laptop computer can be utilized as well as any other digital hardware apparatus which meets or is equivalent to the following minimum requirements, such as it be a 80286 based processor, 10 MHZ, one floppy disk drive, one hard drive of at least 20 MB, 640 KB of Random Access Memory (RAM), and Hercules, CGA, EGA or VGA compatible graphics. The SLAT operational environment is menu driven allowing the user to perform all functions easily and efficiently. Most of the user interaction occurs by using the Laptop keyboard's cursor control keys, function keys, and designated alpha keys, thereby minimizing data entry through typing. Referring to FIG. 1, it will be appreciated that the specific set of program instructions for the SLAT Operational Program 1, and creation of System Databases 2 are well known in the prior art.

Figure 2:
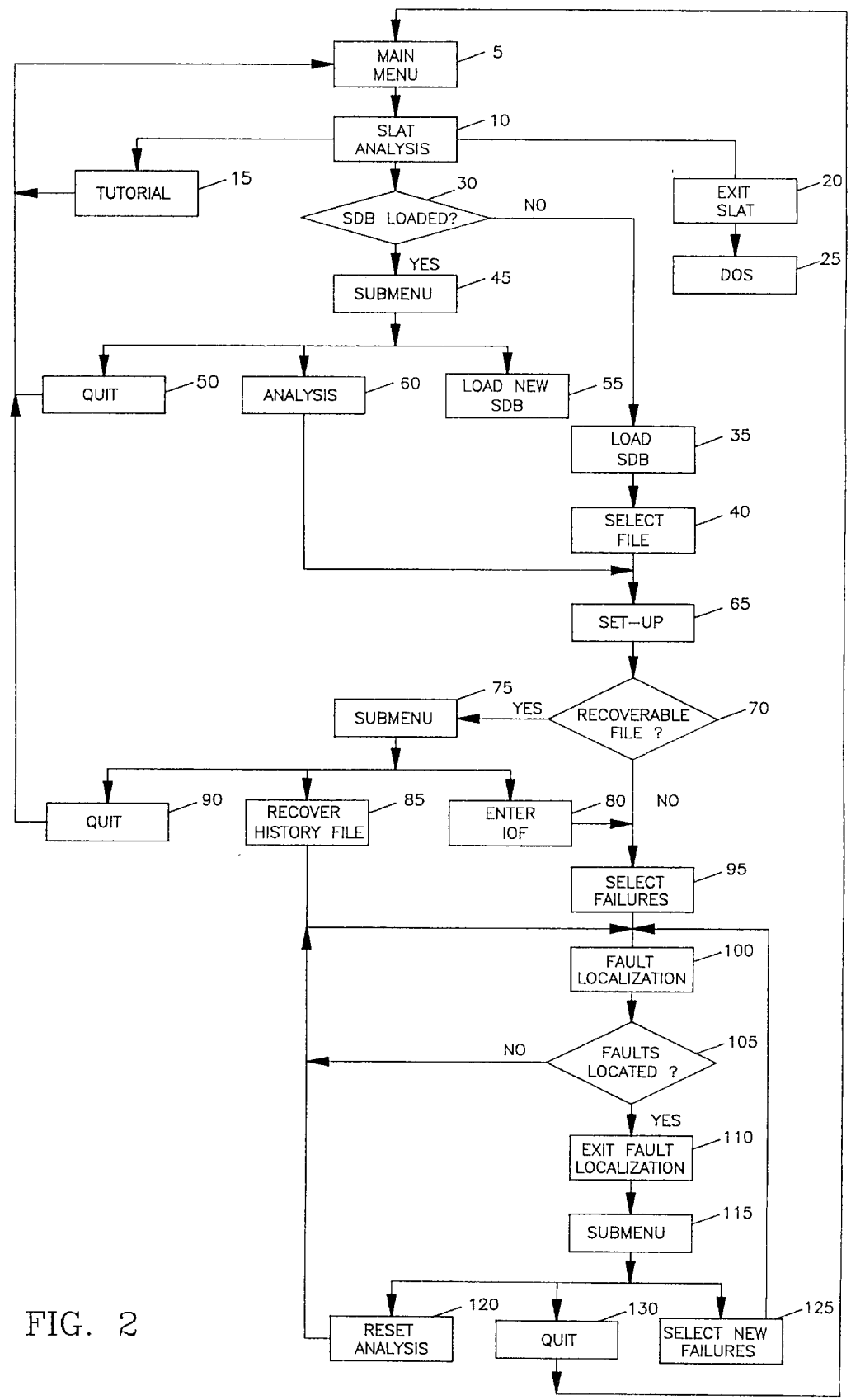
FIG. 2 is a flowchart of SLATs operational data flow.

The SLAT Operational Program 1 contains a variety of menus and subscreens from which the user selects an option or function. Referring to FIG. 2, which illustrates the operational data flow of SLAT, the Main Menu 5 includes three options: SLAT Analysis 10, Tutorial 15, and Exit SLAT 20. The Tutorial option is an interactive tool which helps the operator become familiar with the SLAT operating environment and the Exit SLAT 20 option terminates the current troubleshooting session and returns the operator to DOS item 25. The SLAT Analysis option 10 is the heart of the operational program and when invoked, the operator is prompted to load a system database diskette (SDB) into SLAT's floppy drive 30. The system database contains the nodal representation of checkpoints of the system under analysis and includes technical documentation for each of said nodes to assist the operator in the fault localization process. The system database record structure can be created by any commercial database development tool similar to DBASE and multiple system databases can be stored on one or a plurality of magnetic media. Prior to utilizing a commercial database development tool, the user will hand draw flowcharts to depict the representation of system connectivity. Inputs to the database development tool include system node x-and y-coordinate data, node number inputs to and node number outputs from each node, feedback loop and level numbers for each node (if required), technical documentation for each node, and Initial Recommended Setup Conditions (IRSC) associated with each node. If a system database 30 has not been loaded as indicated in FIG. 2, the operator will load a database diskette 35 and select a desired file 40 from the diskette. If a system database has already been loaded the operator is prompted with a Submenu 45 of options. The operator can quit the current SLAT Analysis Session 50 and return to the Main Menu 5, load a new System Database 55, or perform SLAT Analysis 60. If the user chooses to perform SLAT Analysis 60, a text will be displayed consisting of a checklist of initial Recommended SetUp Conditions 65. The operator can use the initial recommended setup conditions to verify a normal configuration of the system and ensure that the operator is troubleshooting a bonafide fault rather than an obvious error such as an out of position switch or breaker. The operator is next prompted by SLAT as to whether a recoverable file 70 exists. A Recoverable File is a history file of a previous analysis session which was terminated without being completed. If a recoverable file exists, the operator is prompted with a display Submenu 75 consisting of three options. If the operator wishes not to recover a history file after having entered Submenu 75, he may enter the initial observed failures (IOF) option 80 and invoke the fault localization functions 100 of SLAT.

SLAT allows the operator to input all Initial Observed Failures (IOFs). These are the system failures the operator initially observes before performing any fault localization and represent defective pieces of equipment. The critical path of a system database is based on the Initial Observed Failures (IOFs) entered for each analysis session, and consists of those checkpoints which are upstream or downstream from the Initial Observed Failures. Downstream checkpoints are those which have as their input, either directly or indirectly, the output from a node of interest. Upstream checkpoints are all nodes that are input, either directly or indirectly, to a node of interest. Checkpoints upstream from a node of interest are assumed passed, when said node of interest has a passed status. A node of interest with a passed status represents a functioning piece of equipment, hence it is assumed that all inputs into it are also functional. The operator may choose to recover an analysis history file 85, allowing the operator to recover the previous analysis session system database. The analysis history file is created when the user quits SLAT prior to locating all system faults. SLAT saves all inputs to the previous analysis session system database. Thus it allows the operator to resume fault localization with previous inputs entered before quitting. The operator can also execute the quit option 90 at this point returning control to the main menu. If the enter IOF option 80 is executed, the database stored nodal representation of checkpoints corresponding to the equipment under test will be displayed. The operator can scroll this nodal representation and select nodes as failures in the option 95. If a recoverable file 70 does not exist the nodal representation of checkpoints will likewise be displayed allowing the operator to scroll and select initial observed nodes as failures 95. Fault Localization 100, to be discussed subsequently, begins at the time when the nodal representation of checkpoints is displayed. Fault Localization 100 will continue until either all faults 105 are located or the operator exits the Fault Localization Session 110. Upon exiting, a Submenu 115 is displayed. The operator can reset analysis 120 with the previously chosen observed failures being displayed, clearing all inputs made during fault localization. The operator can also select new initial observed failures from the nodal representation 125, returning to the analysis screen to troubleshoot the faults associated with the newly selected observed failures. A newly observed failure may be more critical than the one already under evaluation and the operator may choose to localize faults based on the new failures. SLAT assumes that a single faulty node within a system has been caused by one failed piece of equipment. If after repairing the equipment that SLAT has isolated as the system fault, the user observes the representative node still failing, then a separate troubleshooting session is needed to isolate the source of the failure. Multiple failed nodes may be representative of one failed piece of equipment. This occurs when there is a convergence upstream from all of the failed nodes, and there is a failure of the convergent node. In this situation, SLAT assumes the faulty node has caused the failure of the downstream nodes. If after repairing the equipment representing the convergent node, the operator observes that one or more of the same faults still exist, a separate troubleshooting session is needed to isolate the remaining faults. Multiple failed nodes within a system may lead to the isolation of multiple equipment failures in a single troubleshooting session. This can also occur when no failed convergent node exists upstream from all faulty nodes. In this case, there is no possibility of a single node causing the downstream node failures. Finally, the operator can choose to quit 130 and return to SLAT's main menu 5.

Figure 3:
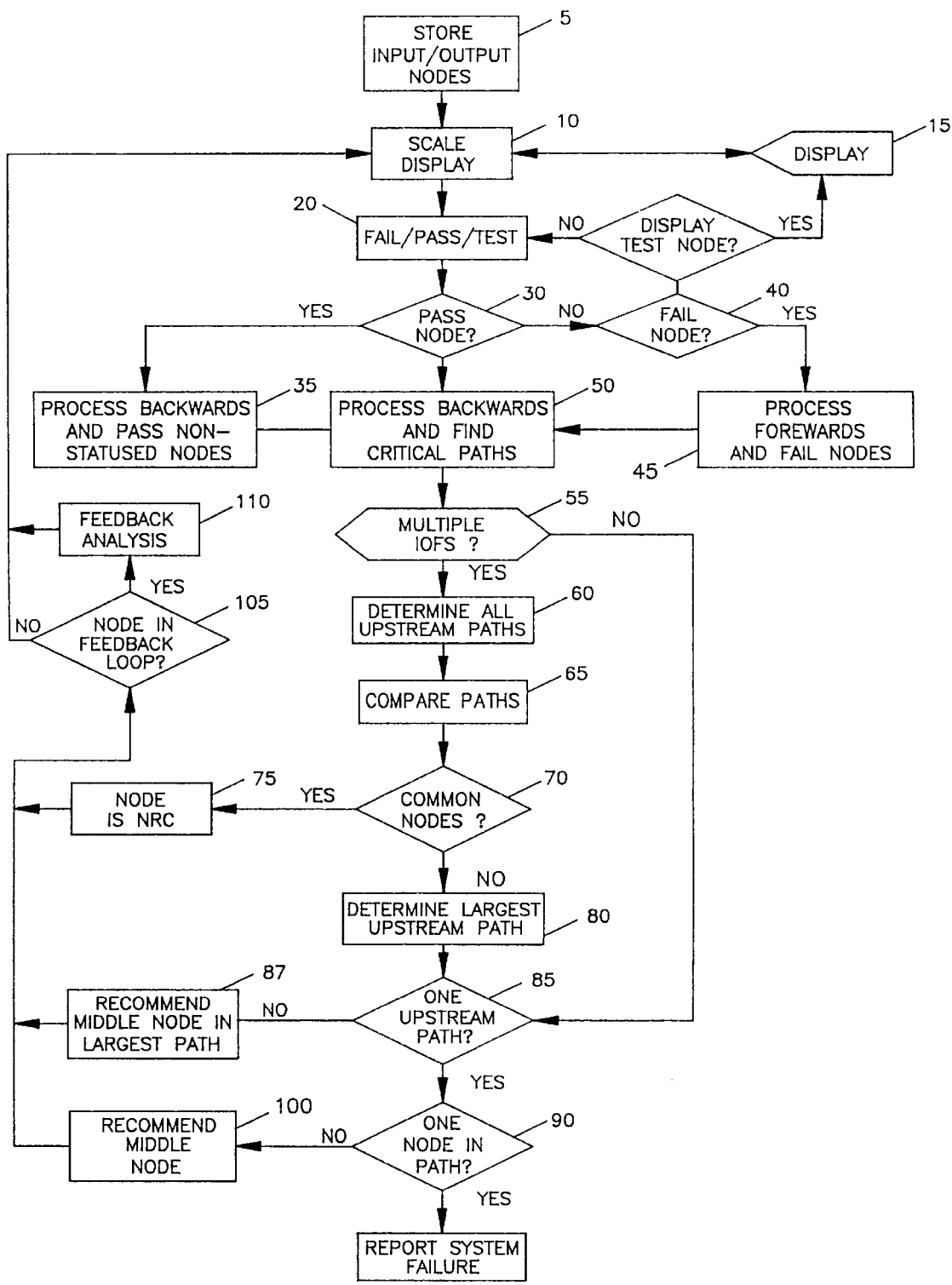
FIG. 3 is a flowchart of SLATs method of fault localization.

Referring to FIG. 3, for a Fault Localization Process SLAT first stores all inputs and outputs 5 to each node of the nodal representation of checkpoints based on input and output fields for each node as defined in the system database. SLAT stores all inputs to a node in an array named Test Point Input (TPI) and all outputs from a node in an array named Test Point Outputs (TPO). Both of these arrays are then used to determine input and output Loop Counters, Loop-I and Loop-O respectively. These loop counters store the number of inputs/outputs to each node. These arrays will be used later in the forward and backward search processing of the SLAT fault localization algorithm. After all inputs and outputs to each checkpoint node are determined SLAT 5 scales the graphical screen display 10 to allow the complete nodal network (network of checkpoints) to be displayed full-screen and defaults to the "ALL" mode graphical display. SLAT graphically displays the system network representation during the troubleshooting process. Within a SLAT database, graphical locations for each node are uniquely defined on a fixed graphical coordinate system consisting of a 99×99 grid array. For each node, the system database structure stores X-(horizontal) and Y-(vertical) coordinate position data, node direction flags (feed forward or feed back), pointer data corresponding to all inputs to each node and all outputs from each node and node specific test procedures. The graphical representations can be toggled between the default mode, "ALL", "sensitized" mode, or "cloaked" mode. The "ALL" mode displays all nodes in the system, including nodes that have the status as passed or failed and nodes that have no-status since they have yet to be examined. The "sensitized" mode will display all nodes with a status or no-status that exist prior to any nodes being passed or failed by the operator. The "cloaked" mode will display critical nodes with no-status only. The cloaked mode is extremely useful in that it allows the operator to view only those nodes that have not been tested. SLAT scales the system network representation and graphically displays the network 15 as joined boxes. The user can choose to display either the node numbers or node-status (passed, failed or no-status) within each checkpoint box. Displayed at the bottom of the screen are various menu options including Pass (a checkpoint), Fail (a checkpoint) and View Test Procedures 20. The Pass and Fail options allow the user to either pass or fail the selected node in a network by inputting a "P" or "F". The selected node is denoted by a box placed around the node and any node can be selected by using SLATs computer keyboard interface. The SLAT algorithm next checks to see if the entered node has already been set to pass or fail by reviewing a status array which is automatically updated when nodes are passed or failed. If a node has already been passed or failed SLAT will notify the operator, and will not perform any analysis. If a node has not been passed or failed, SLAT will pass or fail the node and direct processing to either the pass or fail routines. The operator also has the option to view the test procedures for any particular node within the network 25. When invoked, a text screen displays all test procedures, reference documents, etc. for this node, as stored in the system database. After reviewing the test procedures, the operator may use this information to assist his determination of whether to pass or fail a particular node. It will be appreciated that the specific set of program instructions for SLAT thusfar stated are within the skill of any programmer working within the art to which the present invention pertains. If an operator chooses to fail a node 40, SLAT invokes the fail process routine, otherwise known as the Forward Search Process 45 which determines all nodes downstream from the failed node (in step 40), and updates the node status array to indicate all downstream nodes as failed. SLAT will display the node as "F*", and then will automatically display all nodes downstream from the failed node as "F". SLAT distinguishes between nodes failed by the operator and nodes failed by SLAT. SLAT assumes that if a node is failed, all downstream nodes are also failed. Any nodes downstream from a failure are not considered to be the cause of that failure but are assumed failed nodes since their input is from the output of a failed node and therefore, their data would be corrupted. Again, it should be noted that the tested node is statused with "F*" while the others, failed by inference, are statused as "F". A node is considered the system fault when either all nodes downstream from it are failed and all nodes upstream from it are passed, or all nodes downstream are failed and there are no upstream nodes from the system fault. Nodes that have a status of either passed or failed are ignored during the Forward Search Process so as to expedite the fault localization process. The Forward Searching Process utilizes the TPI/TPO/Loop-I/Loop-O arrays to traverse the linked list of nodes created in the system database. SLAT creates an array called Link which stores all possible paths downstream from the input representing a failure. After Forward Searching a path from the failed node, SLAT will reference the link array to process the remaining downstream paths, utilizing the Forward Search Process previously stated. After failing all required nodes downstream from an initial input representing a failure, SLAT calls a routine which backward-processes the network of nodes 50. This is accomplished by traversing the linked list of network nodes and searching all possible paths upstream (from Parent to Grandparent) from the node failed in 40, while avoiding nodes which already have the status of passed or failed. These paths are also stored in the Link array and are considered "critical" since they represent the possible paths which contain the nodes causing the initially observed failures. These paths are active and need to be analyzed by the operator. If the operator chooses to pass a particular node 30, he would select a node by inputting a "P" via SLATs computer keyboard interface. SLAT will display the passed node as "P" and automatically mark all upstream nodes that feed this node as "P*" denoting pass by inference. SLAT next traverses the linked list of network nodes backwards 35, or upstream (from Parent to Grandparent) from the node passed 30, setting the status flag for each upstream node contained in all upstream paths to "passed". This upstream processing looks for all upstream paths that do not have a status of either passed or failed (i.e., a non-status node). SLAT assumes that the Grandparent node of a passed parent node can not be the source of the failure. These paths are stored in the Link array and are considered non-critical since they represent paths that do not contain the source of the downstream failure. By avoiding nodes with a status of passed/failed, the Fault Localization process is expedited. Upon completion of Backwards Processing 35, SLAT processes backwards from the last failed node and determines all critical paths 50. This is accomplished by traversing the linked list of nodes and searching all possible paths upstream (from parent to grandparent) from the last node failed by the operator, while avoiding nodes already with a status of passed or failed. These paths are stored in the link array and are considered critical since they represent the possible paths in which the fault resides. If multiple IOFs 55 exist SLAT will determine all upstream paths for each IOF and compare paths to find common nodes 60,65. If a common node 70 exists this node will be recommended by SLAT as the next recommended checkpoint (NRC) 75 then SLAT will determine if this node is contained within a feedback loop 105. If no convergent node exists 70 SLAT will determine the largest path upstream 80 from the last failed node then determine if there are multiple upstream paths 85. If there are no multiple IOFs SLAT will likewise determine if there are multiple upstream paths 85. If there is only one path upstream 85 from the last failed node as an input and only one node remains in the path 90, SLAT notifies the user that this node is the source of the system failure 95. If there is more than one node in this single path, SLAT will recommend the middle node 100 for testing and will then determine whether this node is contained within a feedback loop 105. If there is more than one path upstream 85 from the last failed node as an input SLAT will recommend the node in the middle of the largest path upstream from the last failed node for testing 87 and then determine if this node is contained within a feedback loop 105. The SLAT recommended nodes can be passed or failed. This method is expedient in that whether the next recommended checkpoint (NRC) passes or fails, half of the nodes in the longest path are eliminated as possible faults, thereby expediting the troubleshooting process. This process will continue for all failed node paths and each NRC may be bypassed by an operator choosing to test a node other than the node recommended by SLAT. SLAT will display the network of nodes when recommending the next recommended checkpoint (NRC), and allow the troubleshooter to view the test procedures for the NRC or select any other nodes to troubleshoot. SLAT will determine a node to be in a feedback loop if a feedback loop and level number is present in the system database.

Figure 4:
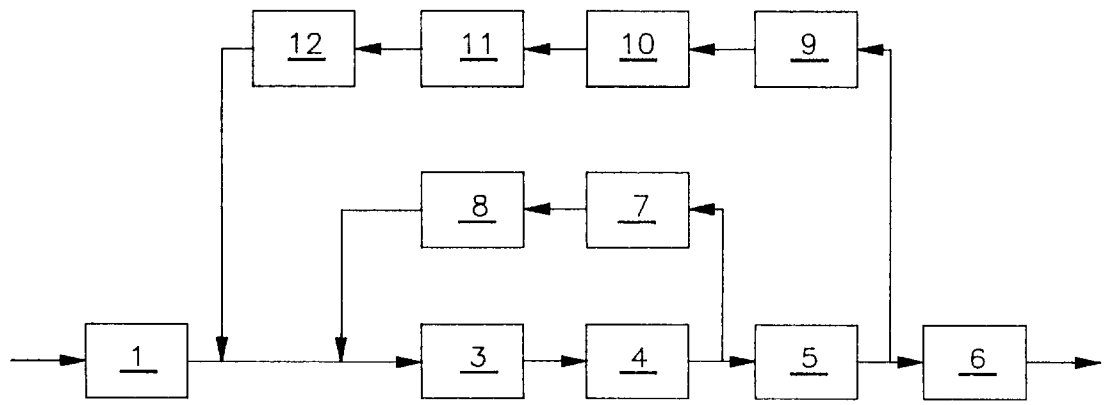
FIG. 4 is a representation of a two level feedback cluster nodal network with both levels feeding back into the same node.
Figure 5:
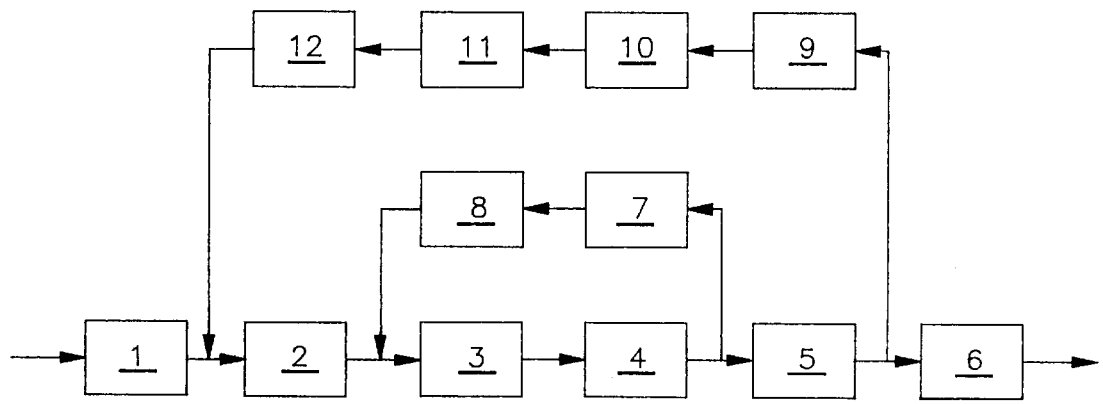
FIG. 5 is a representation of a two level feedback cluster nodal network with a duplicate node 2.

If the node is not contained within a feedback loop, SLAT allows the user to pass, fail, or view test procedures for this node 20, or select a new node to troubleshoot. If the node is contained within a feedback loop 105 SLAT will perform the required feedback analysis 110. FIG. 5 illustrates an example of nested feedback. Nodes 7 and 8 constitute the second level of feedback. Nodes 9, 10, 11, and 12 constitute the first level of feedback. Feedback node direction is to the left and feedforward node direction is to the right. The entire feedback, as defined by the periphery of the highest level of feedback, constitutes a feedback cluster. For simplicity, FIGS. 4 and 5 illustrate two levels of feedback nesting. SLAT feedback analysis is equally effective for multiple feedback levels. All database representations of feedback nests are constrained to resemble FIG. 5. If two levels of nesting feedback to or originate from the same node, node duplication must occur. Referring to FIG. 4 nodes 8 and 12 feedback into node 3 therefore node 3 is duplicated as illustrated as node 2 in FIG. 5. This constraint is imposed on the operator when developing the SLAT system database nodal representation. Unique terminology has been developed for feedback loops. Referring to FIG. 5, node 1 is termed the "entry" node and node 6 is termed the "key" node for feedback level 1. A node can be key or entry to only one feedback level. The operator is required to duplicate nodes as necessary to meet this requirement. Nodes 2 and 5 are the entry and key nodes respectively for feedback level 2. The following method is used to perform fault isolation in a feedback nest: For the purpose of illustration, referring to FIG. 5, assume SLAT has recommended node 10 in feedback level 1 for testing and the upstream paths from the last inputted failure consists of nodes 6, 9, 10, 11, 12, and 1 for path 1, nodes 6, 5, 7, 8, 2, and 1 for path 2, and nodes 6, 5, 4, 3, 2, 1 for path 3. SLAT will recommend level 1 keynode 6 for testing. If Node 6 fails SLAT will recommend node 1, the entry node of feedback level 1, be tested. If node 1 fails, this indicates the fault is not contained within either feedback loop, and analysis is continued upstream from node 1. If node 1 passes, this indicates that the fault is either node 6 or a node within feedback levels 1 and/or 2. There is still hope that node 6 is the fault, so an initial test of node 5 will be recommended, while the feedback Level 1 is still closed with nodes 12 & 2 connected. If node 5 passes, then node 6 is determined to be the fault. If node 5 fails an open loop test of node 5 will be recommended by SLAT. The results of this test are based on the expected behavior of node 5 when there no longer is a physical connection from node 12 to node 2. If node 5 again fails, the fault is suspect to be in feedback level 2 or be node 5. There is also the possibility of having another fault in feedback level 1 which would have to be analyzed in a separate troubleshooting session. Feedback level 2 will now be analyzed as if it were an independent leg by performing both open and closed loop tests as previously stated. If the fault is not found in feedback level 2 then node 5 is the source of the failure. Open and closed loop testing works to expedite the troubleshooting process by eliminating, from fault localization, feedback paths that can not possibly contain the source of the failure. Referring to FIG. 3, following feedback analysis 110 SLAT will scale the graphical display and allow the user to pass, fail or view test procedures 20 for the node recommended by SLAT to be tested or the node selected by the operator and repeats the fault localization process from this node.

Thus, as described above, an apparatus and a method for isolating and analyzing faults is represented by a network comprising a plurality of nodes interconnected by links defining the flow among nodes in the complex system which is stored as a database internal to the apparatus and represents the physical system under test. The faults are localized in the complex system by data structure search methods used successively passing and/or failing system nodes based upon the observed status of the system. It will be understood that many additional changes in the details, steps and arrangements of parts, which have been described and illustrated, maybe made without deviating from the teachings of subject invention as expressed in the appended claims.

What is claimed is:

1. An apparatus for isolating and analyzing faults in a system represented by a network of a plurality of nodes interconnected by links wherein an operator successively passes and/or fails nodes based on observed system status and technical information provided by the apparatus, said apparatus comprising:

storage means for storing node data representative of the system and documentation data pertaining to each of said nodes:

graphical screen display means for displaying said node data and said documentation data;

programmable means comprising a programmed data processor for retrieving said node and documentation data from said storage means, scaling means for scaling said node data to allow said node data to be displayed on full screen, to aid the operator in the process of fault localization which further includes a plurality of graphical representations of said node data and a plurality of display menu options wherein said plurality of graphical representations includes an "All" mode which displays all nodes with status and without status of said plurality of nodes, a "Sensitized Mode" which displays all nodes with status and without status of said plurality of nodes that exist prior to any of said nodes being passed or failed by the operator and a "Cloaked Mode" which displays all nodes of no-status critical nodes of said plurality of nodes only.

2. An apparatus as defined in claim 1 wherein said plurality of said display menu options includes means for passing said plurality of nodes, and means for failing said nodes of said plurality of nodes.

3. An apparatus as defined in claim 1 wherein programmable means for accepting said operator input of selected said nodes of said plurality of nodes as passed or failed is through a manual interface.

4. An apparatus for isolating and analyzing faults in a system represented by a network of a plurality of nodes interconnected by links wherein an operator successively passes and/or fails nodes based on observed system status and technical information provided by the apparatus, the apparatus comprising:

storage means for storing node data representative of the system and documentation data pertaining to each of said nodes;

graphical screen display means for displaying said node data and said documentation data; and programmable means comprising a programmed data processor for retrieving said node and documentation data from said storage means, displaying said node and documentation data to said graphical screen display means to aid the operator in the process of fault localization, accepting operator input of selected said nodes as passed or failed, and localizing faults in the system based on said operator input of selected said nodes as passed or failed, wherein said programmable means for localizing faults in the system further includes:

means for passing said nodes of said plurality of nodes upstream from a node of status passed as an input by said operator;

means for failing said nodes of said plurality of nodes downstream from a node of status failed as an input by said operator;

means for displaying said documentation data for said determined node to aid the operator in repairing said determined node;

means for creating a recoverable file when a previous analysis session is terminated without being completed;

means for storing all upstream paths from said node of status failed as input by said operator; and means for determining a node from said stored upstream paths to be examined for failure wherein said means for determining a node further includes processing multiple failed nodes wherein said means for processing said multiple failed nodes further includes comparing said upstream oaths of said multiple failed nodes to find a common node then recommending said common node to be examined for failure.

5. An apparatus as defined in claim 4 wherein said means for recommending a node out of said plurality of nodes to be tested includes means for feedback loop processing of said recommended node.

6. An apparatus as defined in claim 5 wherein said means for feedback loop processing includes means for determining all upstream paths for a plurality of closed feedback level loops beginning at the last inputted failure, means for determining nodes to be tested for failure in said upstream paths of said plurality of closed feedback level loops by opening the outermost closed feedback level loops and isolating the source of the failure in the next lower level closed feedback level loops.

7. An apparatus as defined in claim 6 wherein said means for feedback loop processing with said plurality of closed feedback level loops further includes means for recommending for testing a keynode in said outermost closed feedback level loop, means for recommending for testing the entry node of said outermost closed feedback level loop if said keynode is a failed node, means for recommending for testing a node upstream from said entry node of said outermost closed feedback level loop if said entry node is a failed node, means for recommending for testing the keynode of said next lower level closed feedback level loop if said entry node of said outermost closed feedback level loop is not a failed node, and means for recommending as a failure the keynode of said outermost closed feedback level loop if said keynode of said next lower level closed feedback level loop is not a failed node.

8. An apparatus as defined in claim 7 wherein said means for closed feedback level loop processing further includes repeatedly opening any of said outermost closed feedback level loops and processing said next lower level closed feedback level loops by said closed feedback level loop processing until a fault is localized.

9. An apparatus for isolating and analyzing faults in a system represented by a network of a plurality of nodes interconnected by links wherein an operator successively passes and/or fails nodes based on observed system status and technical information provided by the apparatus, the apparatus comprising:

storage means for storing node data representative of the system and documentation data pertaining to each of said nodes;

graphical screen display means for displaying said node data and said documentation data;

programmable means comprising a programmed data processor for retrieving said node and documentation data from said storage means, displaying said node and documentation data to said graphical screen display means to aid the operator in the process of fault localization, accepting operator input of selected said nodes as passed or failed, and localizing faults in the system based on said operator input of selected said nodes as passed or failed, wherein said programmable means for localizing faults in the system further includes:

means for passing said nodes of said plurality of nodes upstream from a node of status passed as an input by said operator;

means for failing said nodes of said plurality of nodes downstream from a node of status failed as an input by said operator;

means for displaying said documentation data for said determined node to aid the operator in repairing said determined node;

means for creating a recoverable file when a previous analysis session is terminated without being completed;

means for storing all upstream paths from said node of status failed as input by said operator;

means for determining a node from said stored upstream paths to be examined for failure wherein said means for determining a node further includes processing multiple failed nodes and said means for storing all upstream paths from said node of status failed as input by said operator further includes storing the size of the largest upstream paths; and said means for determining a node out of said plurality of nodes from said stored upstream paths to be examined for failure further includes means for recommending a middle node of said plurality of nodes in said largest path for testing when there is more than one of said upstream paths, means for recommending a middle upstream path node for testing when there is only one of said upstream paths and means for recommending a single node for testing when said single node is the only node in said single upstream path.

10. An apparatus for isolating and analyzing faults in a system represented by a network of a plurality of nodes interconnected by links wherein an operator successively passes and/or fails nodes based on observed system status and technical information provided by the apparatus, the apparatus comprising:

storage means for storing node data representative of the system and documentation data pertaining to each of said nodes;

graphical screen display means for displaying said node data and said documentation data;

programmable means comprising a programmed data processor for retrieving said node and documentation data from said storage means, displaying said node and documentation data to said graphical screen display means to aid the operator in the process of fault localization, accepting operator input of selected said nodes as passed or failed, and localizing faults in the system based on said operator input of selected said nodes as passed or failed, wherein said programmable means for localizing faults in the system further includes:

means for passing said nodes of said plurality of nodes upstream from a node of status passed as an input by said operator and includes updating a status array to indicate passed status of said upstream passed nodes when said status array has not been previously updated with said passed status;

means for failing said nodes of said plurality of nodes downstream from a node of status failed as an input by said operator;

means for displaying said documentation data for said determined node to aid the operator in repairing said determined node;

means for creating a recoverable file when a previous analysis session is terminated without being completed;

means for storing all upstream paths from said node of status failed as input by said operator wherein said storing means for storing paths avoid said storage of upstream paths containing said upstream passed nodes; and means for determining a node from said stored upstream paths to be examined for failure wherein said means for determining a node further includes processing multiple failed nodes wherein said means for processing said multiple failed nodes further includes comparing said upstream paths of said multiple failed nodes to find a common node then recommending said common node to be examined for failure.

11. A method for isolating and analyzing faults in a system, comprising the steps of:

storing node data representative of the system and documentation data pertaining to each of said nodes in a system database;

accepting operator input of selected said nodes as passed or failed; and localizing faults in the system based on said operator input of selected said nodes as passed or failed;

displaying said node data and said documentation data to a graphical screen display to aid the operator in isolating and analyzing faults wherein said step of displaying said plurality of graphical representations includes:

an "All" mode which displays all nodes with status and without status of said nodes;

a "Sensitized Mode" which displays all nodes with status and without status of said nodes that exist prior to any of said nodes being passed or failed by the operator; and a "Cloaked Mode" which displays all nodes without status of said nodes only and scaling said node data to allow said node data to be displayed full screen; displaying a plurality of graphical representations of said data; and displaying a plurality menu options.

12. A method as defined in claim 11 wherein said step for displaying said plurality of said display menu options includes:

passing said nodes; and failing said nodes.

13. A method for isolating and analyzing faults in a system, comprising the steps of:

storing node data representative of the system and documentation data pertaining to each of said nodes in a system database;

displaying said node data and said documentation data to a graphical screen display to aid the operator in isolating and analyzing faults;

accepting operator input of selected said nodes as passed or failed and includes passing nodes upstream from said operator inputted passed node, failing nodes downstream from said operator inputted failed node, storing all upstream paths from said operator inputted failed node, determining a node from said stored upstream paths to be examined for failure, displaying said documentation data for said determined node to aid the operator in repairing said determined node and creating a recoverable file when a previous analysis session is terminated without being completed;

localizing faults in the system based on said operator input of selected said nodes as passed or failed; and wherein said step of determining a node further includes processing multiple failed nodes and further includes comparing said upstream paths of said multiple failed nodes to find a common node and then recommend said common node to be examined for failure.

14. A method as defined in claim wherein said step of localizing faults in the system based on said operator input of selected said nodes as passed or failed, further includes updating a status array to indicate passed status of said upstream passed nodes when said status array has not been previously updated with said passed status, storing all upstream paths from said operator's failed node input while avoiding said storage of upstream paths containing said upstream passed nodes.

15. A method for isolating and analyzing faults in a system as defined in claim 11, wherein said step of localizing faults in the system based on said operator input of selected said nodes as passed or failed further includes passing nodes upstream from said operator's passed node input, failing nodes downstream from said operator's failed node input, storing all upstream paths from said operator's failed node input including storing the size of the largest of said upstream paths, determining a node from said stored upstream paths to be examined for failure, wherein said step of determining a node further includes recommending a middle node in said largest path for testing when there is more than one of said upstream paths;

recommending a middle upstream path node for testing when there is only one of said upstream paths; and recommending a single node for testing when said single node is the only node in said single upstream path, and displaying said documentation data for said determined node to aid the operator in repairing said determined node and creating a recoverable file when a previous analysis session is terminated without being completed.

16. A method for isolating and analyzing faults in a system, comprising the steps of:

storing node data representative of the system and documentation data pertaining to each of said nodes in a system database;

displaying said node data and said documentation data to a graphical screen display to aid the operator in isolating and analyzing faults;

accepting operator input of selected said nodes passed or failed; and localizing faults in the system based on said operator input of selected said nodes as passed or failed and further includes passing nodes upstream from said operator inputted passed node, failing nodes downstream from said operator inputted failed node, storing all upstream paths from said operator inputted failed node, determining a node from said stored upstream paths to be examined for failure, displaying said documentation data for said determined node to aid the operator in repairing said determined node and creating a recoverable file when a previous analysis session is terminated without being completed and further includes:

recommending a middle node in said largest path for testing when there is more than one of said upstream paths;

recommending a middle upstream path node for testing when there is only one of said upstream paths; and recommending a single node for testing when said single node is the only node in said single upstream path and in the step of determining a node further includes feedback loop processing of said determined node.

17. A method as defined in claim 16 wherein said feedback loop processing includes determining all upstream paths for a plurality of closed feedback level loops beginning at the last inputted failure, and determining nodes to be tested for failure in said upstream paths of said plurality of closed feedback level loops by opening the outermost closed feedback level loops and isolating the source of the failure in the next lower level closed feedback level loops.

18. A method as defined in claim 17 wherein said step of feedback loop processing with said plurality of closed feedback level loops further includes:

recommending for testing a keynode in said outermost closed feedback level loop;

recommending for testing an entry node of said outermost closed feedback level loop if said keynode is a failed node;

recommending for testing a node upstream from said entry node of said outermost closed feedback level loop if said entry node is a failed node;

recommending for testing said keynode of said next lower level closed feedback level loop if said entry node of said outermost closed feedback level loop is not a failed node; and recommending as a failure said keynode of said outermost closed feedback level loop if said keynode of said next lower level closed feedback level loop is not a failed node.

19. A method as defined in claim 18 wherein said closed feedback level loop processing further includes repeatedly opening any of said outermost closed feedback level loops and processing said next lower level closed feedback level loops by said closed feedback level loop processing until a fault is localized.

* * * * *